(12) United States Patent
Lee et al.

(10) Patent No.: US 10,382,950 B2
(45) Date of Patent: Aug. 13, 2019

(54) TECHNIQUES AND APPARATUSES FOR ACCESSING A HEADER-COMPRESSED BROADCAST TRANSMISSION

(71) Applicant: QUALCOMM Incorporated, San Diego, CA (US)

(72) Inventors: Kuo-Chun Lee, San Diego, CA (US); Sivaramakrishna Veerepalli, San Diego, CA (US); Min Wang, San Diego, CA (US); Ralph Akram Gholmieh, San Diego, CA (US); Nagaraju Naik, San Diego, CA (US); Carlos Pazos, Carlsbad, CA (US); Alan Soloway, Erie, CO (US); Haris Zisimopoulos, London (GB); Xipeng Zhu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 15/703,505

(22) Filed: Sep. 13, 2017

(65) Prior Publication Data

US 2018/0007545 A1 Jan. 4, 2018

(30) Foreign Application Priority Data

Sep. 16, 2016 (GR) .................................. 16100476

(51) Int. Cl.
*H04J 3/24* (2006.01)
*H04W 8/24* (2009.01)
(Continued)

(52) U.S. Cl.
CPC ............. *H04W 8/245* (2013.01); *H04W 4/06* (2013.01); *H04W 48/14* (2013.01); *H04B 7/0413* (2013.01); *H04B 7/0697* (2013.01)

(58) Field of Classification Search
CPC ........ H04W 8/245; H04W 4/06; H04W 48/14
(Continued)

(56) References Cited

U.S. PATENT DOCUMENTS

| 7,822,067 B2 * | 10/2010 | Jin ...................... H04L 12/1877 370/477 |
| 2005/0074024 A1 * | 4/2005 | Kim ........................ H04L 12/18 370/432 |

(Continued)

FOREIGN PATENT DOCUMENTS

WO 2005015881 A2 2/2005

OTHER PUBLICATIONS

International Search Report and Written Opinion—PCT/US2017/051588—ISA/EPO—Nov. 22, 2017.

*Primary Examiner* — Thai D Hoang
(74) *Attorney, Agent, or Firm* — Harrity & Harrity, LLP

(57) ABSTRACT

Certain aspects of the present disclosure generally relate to wireless communications. In some aspects, a mobile device may receive configuration information, associated with configuring a state of the mobile device, via a unicast transmission, and may access a header-compressed broadcast transmission using the configuration information received via the unicast transmission. In some aspects, a network entity may transmit configuration information, to facilitate decompression of a header-compressed broadcast transmission, via a unicast transmission to a mobile device of a plurality of mobile devices, and may transmit the header-compressed broadcast transmission to the plurality of mobile devices in accordance with the configuration information.

30 Claims, 9 Drawing Sheets

(51) Int. Cl.
*H04W 4/06* (2009.01)
*H04W 48/14* (2009.01)
*H04B 7/06* (2006.01)
*H04B 7/0413* (2017.01)

(58) Field of Classification Search
USPC ....... 370/259, 270, 312, 349, 466, 469, 475, 370/477
See application file for complete search history.

(56) References Cited

U.S. PATENT DOCUMENTS

| | | | |
|---|---|---|---|
| 2006/0104266 A1* | 5/2006 | Pelletier | H03M 7/30 370/389 |
| 2014/0119264 A1 | 5/2014 | Shauh et al. | |
| 2017/0324524 A1* | 11/2017 | Zhou | H04L 5/0007 |
| 2018/0007545 A1* | 1/2018 | Lee | H04W 8/245 |
| 2018/0048854 A1* | 2/2018 | Kwak | H04L 1/0041 |
| 2018/0139650 A1* | 5/2018 | Kwon | H04L 29/06 |

* cited by examiner

TECHNIQUES AND APPARATUSES FOR ACCESSING A HEADER-COMPRESSED BROADCAST TRANSMISSION

CROSS-REFERENCE TO RELATED APPLICATIONS UNDER 35 U.S.C. § 119

This application claims priority to Greek Patent Application 20160100476 filed on Sep. 16, 2016 entitled "TECHNIQUES AND APPARATUSES FOR ACCESSING A HEADER-COMPRESSED BROADCAST TRANSMISSION," which is incorporated by reference herein.

FIELD OF THE DISCLOSURE

Aspects of the present disclosure generally relate to wireless communications, and more particularly to techniques and apparatuses for accessing a header-compressed broadcast transmission, such as techniques and apparatuses for accessing a header-compressed broadcast transmission using configuration information received via a unicast transmission.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication performed by a mobile device may include receiving configuration information associated with configuring a state of the mobile device via a unicast transmission. The method may include accessing a header-compressed broadcast transmission using the configuration information received via the unicast transmission.

In some aspects, a mobile device may include one or more processors configured to receive configuration information associated with configuring a state of the mobile device via a unicast transmission. The one or more processors may be configured to access a header-compressed broadcast transmission using the configuration information received via the unicast transmission.

In some aspects, a method of wireless communication performed by a network entity may include transmitting configuration information associated with configuring decompression of a header-compressed broadcast transmission via a unicast transmission to a mobile device of a plurality of mobile devices. The method may include transmitting the header-compressed broadcast transmission to the plurality of mobile devices in accordance with the configuration information.

In some aspects, a network entity may include one or more processors configured to transmit configuration information associated with configuring decompression of a header-compressed broadcast transmission via a unicast transmission to a mobile device of a plurality of mobile devices. The one or more processors may be configured to transmit the header-compressed broadcast transmission to the plurality of mobile devices based on transmitting the configuration information associated with configuring decompression of the header-compressed broadcast transmission.

Aspects generally include a method, wireless communication device, computer program product, non-transitory computer-readable medium (e.g., for storing instructions), and user equipment (UE), as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
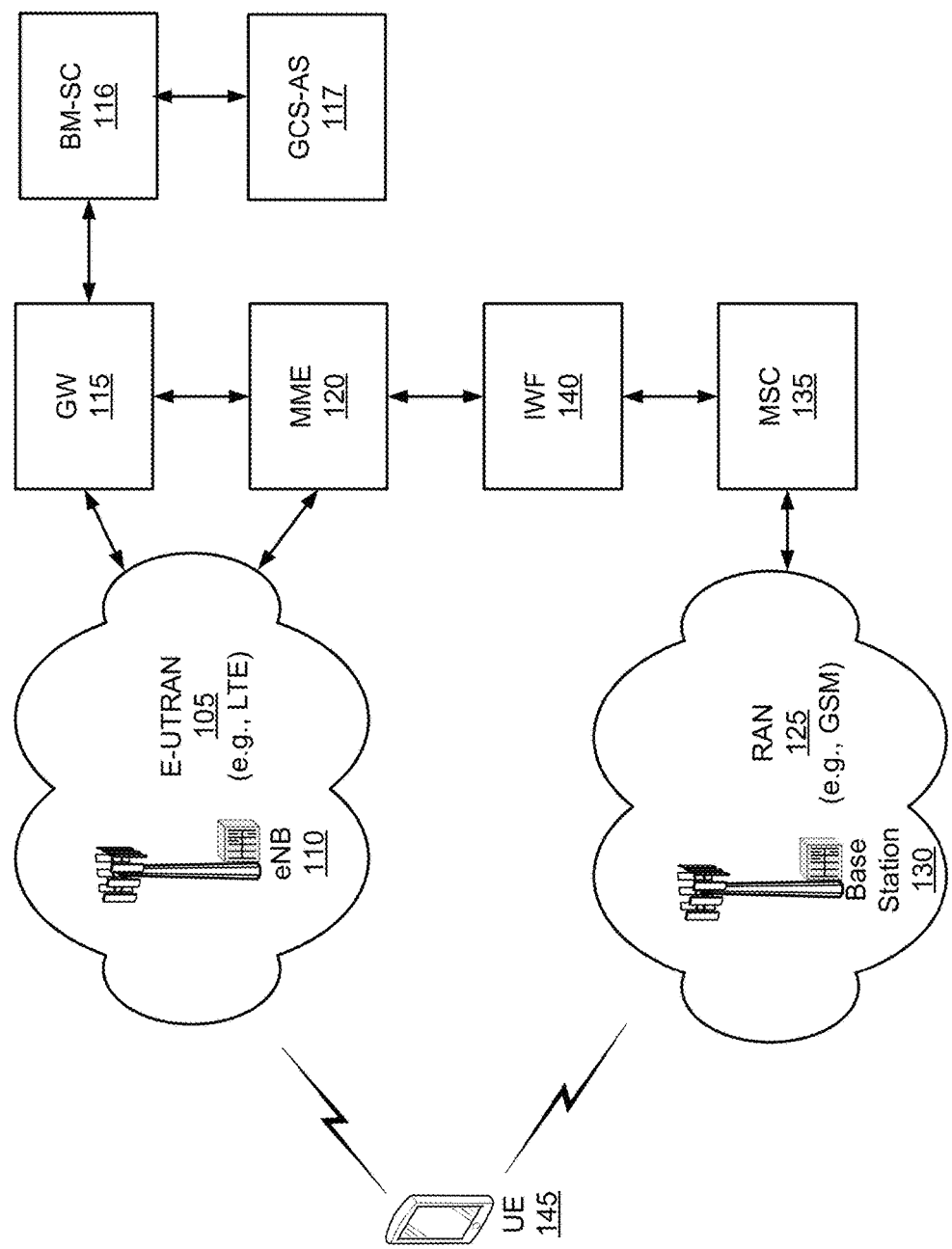
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. As shown, example deployment 100 may include a first radio access network (RAN), such as an evolved universal terrestrial radio access network (E-UTRAN) 105, which may include one or more evolved Node Bs (eNBs) 110, and which may communicate with other devices or networks via a gateway (GW) 115 (e.g. serving gateway (SGW), packet data network gateway (PGW) and/or a multimedia broadcast multicast services (MBMS) gateway (MBMS-GW)), which may be associated with a broadcast multicast service center (BM-SC) 116 and/or a group call service application server (GCS AS) 117, and/or a mobility management entity (MME) 120. As further shown, example deployment 100 may include a second RAN 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110. Each eNB 110 may provide communication coverage for a particular geographic area. The term "cell" may refer to a coverage area of eNB 110 and/or an eNB subsystem serving the coverage area.

GW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and GW 115 and may perform various functions, such as mobility management, bearer management, distribution of paging messages, security control, authentication, gateway selection, and/or the like, for UEs 145 located within a geographic region served by MME 120 of E-UTRAN 105. In some aspects, MME 120 may utilize tracking area information identifying a tracking area of UE 145 to direct paging messages and/or the like toward UE 145. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available. Furthermore, GW 115 may access BM-SC 116 and/or GCS AS 117 to provide an eMBMS call, a GCS call, or the like.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a common RAT). In some aspects, E-UTRAN 105 and RAN 125 may use a common frequency and/or a common RAT to communicate with UE 145. In some aspects, E-UTRAN 105 and RAN 125 may use different frequencies and/or different RATs to communicate with UEs 145.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, a mobile device, and/or the like. UE 145 may be a cellular phone, a personal digital assistant (PDA), a wireless modem, a wireless communication device, a handheld device, a laptop computer, a cordless phone, a wireless local loop (WLL) station, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

According to the present disclosure, a broadcast transmission may be utilized to direct a communication from a first eNB 110 to multiple UEs 145 with a reduced utilization of network resources relative to directing multiple unicast transmissions to the multiple UEs 145. For example, a network operator may provide a group call service (GCS) call or a mission-critical push-to-talk (MCPTT) call using an evolved multimedia broadcast multicast services (eMBMS) transmission to direct the communication from the eNB 110 to the multiple UEs 145. However, packets of the eMBMS transmission may include duplicated header information that may cause the eMBMS transmission to require an excessive allocation of network resources.

Robust header compression (RoHC) may be performed to compress a header of a packet to a subset of bits of the header, thereby reducing an amount of network traffic associated with transmitting the packet. For example, when directing a broadcast transmission to UE 145, a network entity (i.e., a network device), such as eNB 110 or the like, may utilize RoHC to reduce an amount of overhead associated with the broadcast transmission. In this case, the network entity may communicate with UE 145 to configure a decompressor of UE 145, and may transmit a header-compressed broadcast transmission to UE 145 in accordance with the configuration.

Based on a header-compressed broadcast transmission being provided to multiple UEs 145, the network entity may be required to interrupt the header-compressed broadcast transmission when a new UE 145 requests access to the header-compressed broadcast transmission. In this case, the network entity may interrupt the header-compressed broadcast transmission, and may provide configuration information to each UE 145 when a single UE 145 requires configuration information. Interrupting the header-compressed broadcast transmission may result in degraded network performance for the multiple UEs 145. Moreover, the network entity may cause excess network traffic when attempting to configure decompression for each UE 145 whenever a single UE 145 newly requests access to the header-compressed broadcast transmission. Moreover, using unicast transmission to configure access to a broadcast transmission may permit a UE 145 to join a broadcast transmission during the broadcast transmission rather than requiring all configuration of all UEs 145 to be completed prior to a start of the broadcast transmission.

UE 145 may access a header-compressed broadcast transmission using configuration information received via a unicast transmission (e.g., dedicated signaling). For example, UE 145 may receive configuration information via a unicast transmission from a network entity, and may configure a state of a decompressor of UE 145 to access a header-compressed broadcast transmission. In this case, UE 145 may configure the state of the decompressor to synchronize the decompressor with a compressor of the network entity.

UE 145 may access the header-compressed broadcast transmission based on configuring decompression of the header-compressed broadcast transmission. For example, the network entity may provide the header-compressed broadcast transmission via eMBMS to a group of UEs 145, and each UE 145 may perform RoHC decompression on packets of the header-compressed broadcast transmission to obtain information conveyed via the header-compressed broadcast transmission, such as a set of voice frames or the like.

In this way, the techniques and apparatuses, described herein, may ensure that when a UE 145 attempts to access a header-compressed broadcast transmission, the header-compressed broadcast transmission is not required to be interrupted to configure decompression for a given UE 145 nor are all UEs 145 required to be configured prior to the start of the header-compressed broadcast transmission. Moreover, based on UE 145 utilizing a unicast transmission (e.g., dedicated signaling) to receive configuration information from a network entity, UE 145 and/or the network entity reduce an amount of overhead used to convey packet headers or the like and improve the utilization of processing resources relative to requiring each UE 145, of a group of UEs 145 receiving the header-compressed broadcast transmission, to receive and process configuration information.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
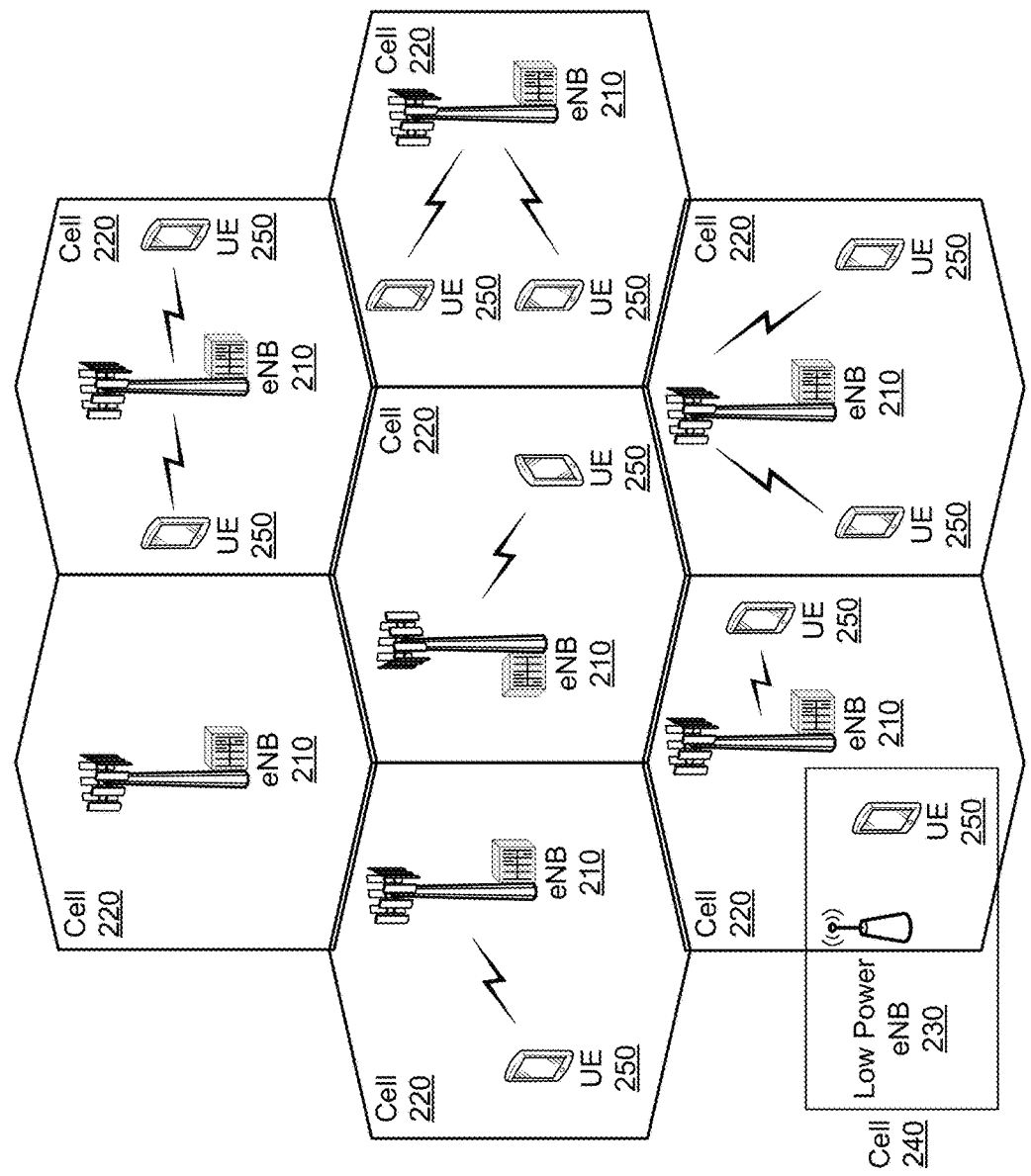
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to GW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

UE 145, 250 may receive configuration information from eNB 110, 210, 230 via a unicast transmission. For example, eNB 110, 210, 230 may utilize dedicated signaling, such as a group call type 1 (GC-1) signal, a radio resource control (RRC) signal, or the like to transmit configuration information to UE 145, 250. In some aspects, the configuration information may include a set of initialization and refresh (IR) packets to synchronize a decompressor of UE 145, 250 with a compressor of eNB 110, 210 230. Additionally, or alternatively, the configuration information may include a set of IR dynamic type (IR-DYN) packets to maintain synchronization subsequent to an initial configuration of the decompressor.

UE 145, 250 may access a header-compressed broadcast transmission using the configuration information received via the unicast transmission from eNB 110, 210, 230. For example, UE 145, 250 may synchronize a state of a decompressor of UE 145, 250, and may utilize the decompressor to decompress a header-compressed broadcast transmission that is being provided by eNB 110, 210, 230 to a group of UEs 145, 250. In this way, eNB 110, 210, 230 provides configuration information via a unicast transmission to permit UE 145, 250 to access a header-compressed broadcast transmission, thereby reducing network resources relative to multiple UEs 145, 250 receiving header-compressed unicast transmissions. Moreover, based on utilizing dedicated signaling, UE 145, 250 and/or eNB 110, 210, 230 improve use of header-compressed broadcast transmission relative to another technique that requires the header-compressed broadcast transmission to be interrupted to provide configuration information to each UE 145, 250.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 110, 210, 230 may have multiple antennas supporting MIMO technology. The use of MIMO technology enables eNBs 110, 210, 230 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 110, 210, 230 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR), which is sometimes referred to as a PAR value.

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
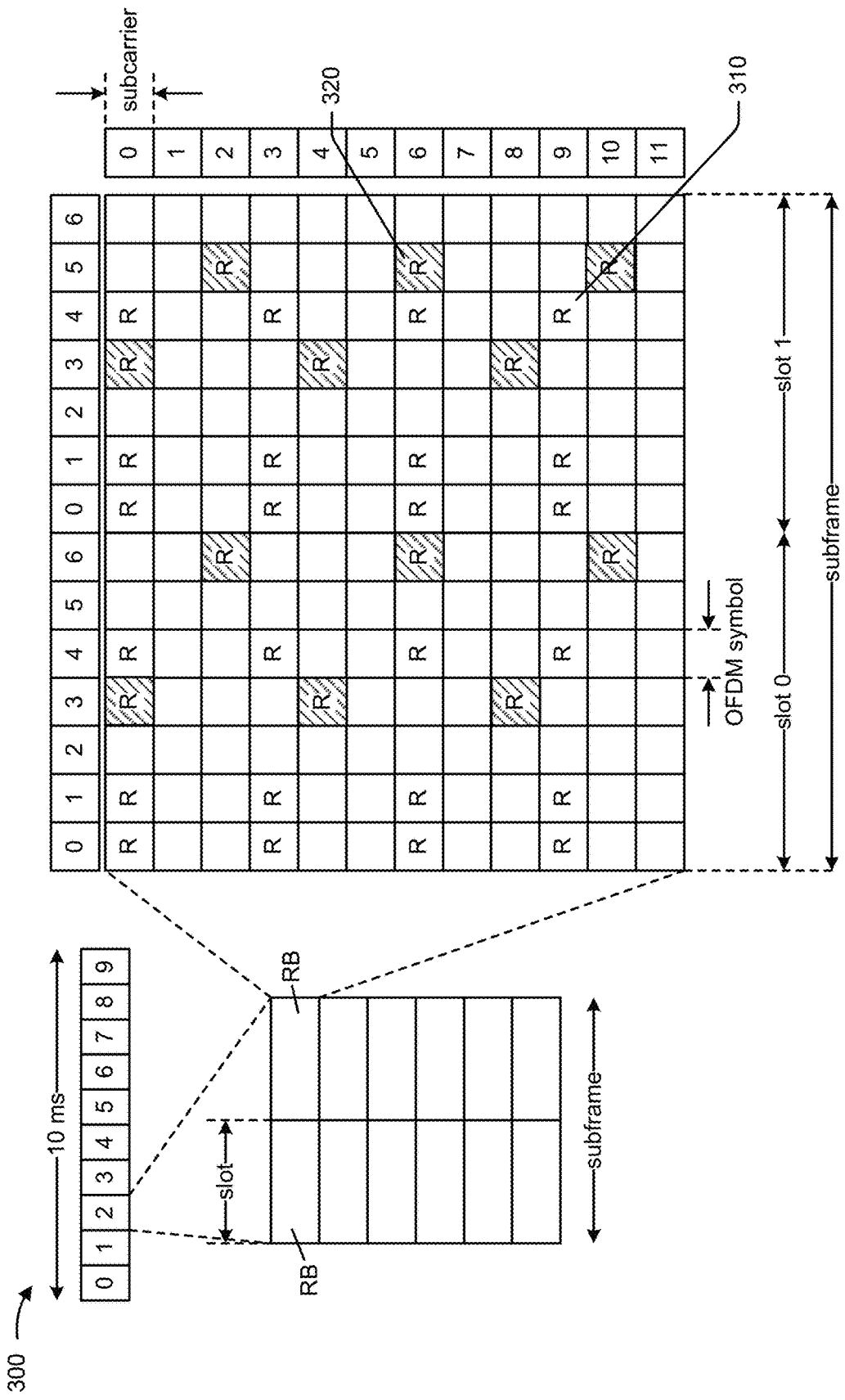
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

UE 145, 250 may receive information from eNB 110, 210, 230 via a DL frame, as described herein. For example, eNB 110, 210, 230 may provide and UE 145, 250 may receive configuration information via a set of DL frames of a unicast transmission. In this case, eNB 110, 210, 230 may provide the configuration information to UE 145, 250 via the unicast transmission based on UE 145, 250 requesting access to a header-compressed broadcast transmission, based on a decompressor of UE 145, 250 losing synchronization, or the like. The UE 145, 250 may utilize the configuration information to configure a decompressor state for performing RoHC decompression of a header-compressed broadcast transmission. eNB 110, 210, 230 may provide the header-compressed broadcast transmission to UE 145, 250 via another set of DL frames, and UE 145, 250 may perform RoHC decompression to access the header-compressed broadcast transmission. In this way, eNB 110, 210, 230 permits header-compressed broadcast transmission for a group of UEs 145, 250 without requiring configuration information to be provided to the group of UEs 145, 250 when a single UE 145, 250 needs to be configured for RoHC decompression and without requiring each UE 145, 250 to be configured prior to a start of a header-compressed broadcast transmission.

As indicated above, FIG. 3 is provided as an example. Other examples are possible and may differ from what was described above in connection with FIG. 3.

Figure 4:
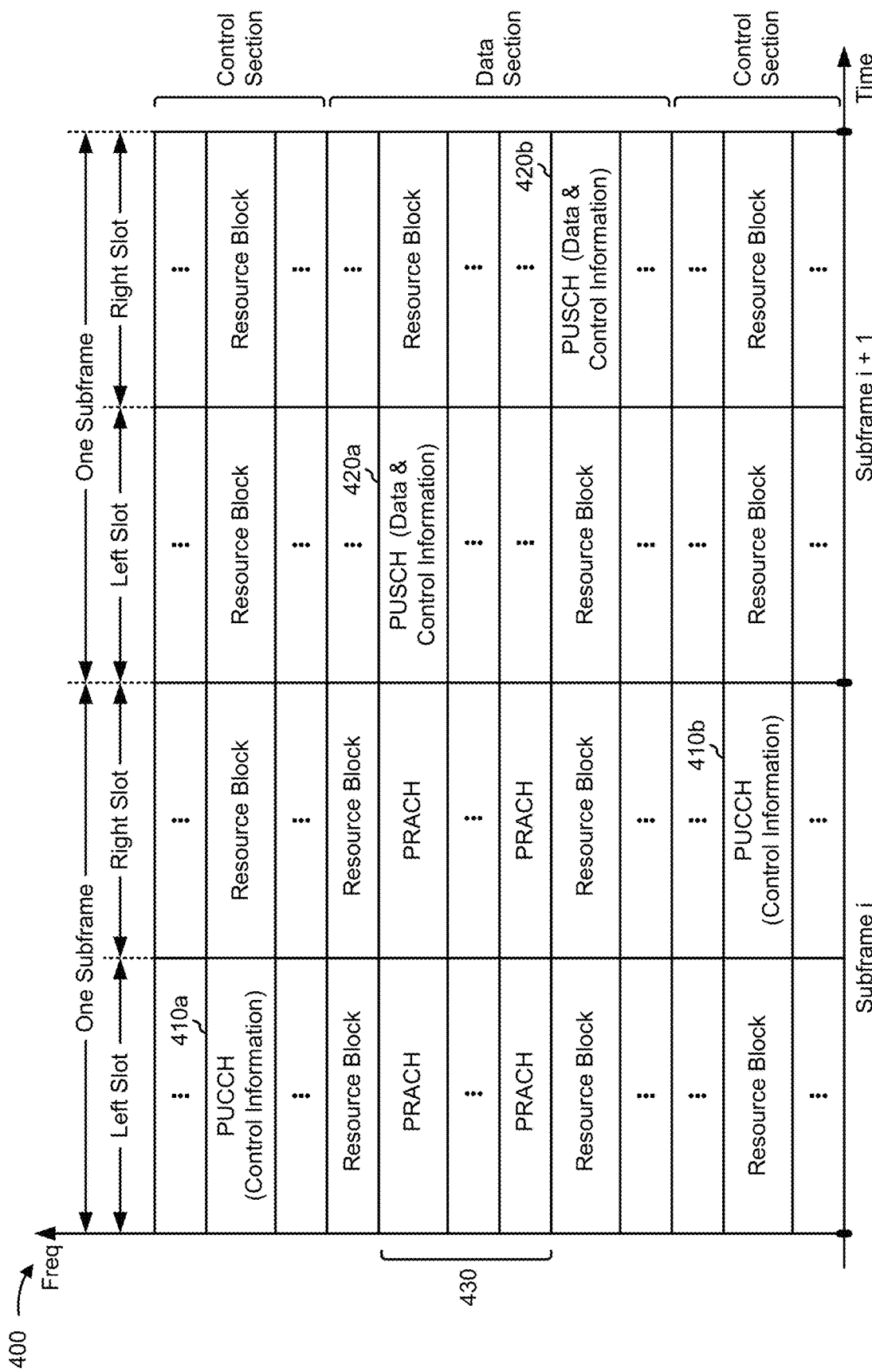
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

UE 145, 250 may transmit one or more signals via a UL frame, as described herein. For example, based on determining that UE 145, 250 is to access a broadcast transmission, UE 145, 250 may transmit a request to eNB 110, 210, 230 to receive configuration information to set a state of a decompressor of UE 145, 250. Additionally, or alternatively, UE 145, 250 may identify a threshold quantity of checksum failures (e.g., cyclic redundancy check (CRC) failures), which may indicate that the decompressor is out of synchronization. In this case, UE 145, 250 may transmit a request to eNB 110, 210, 230 to receive configuration information to reset a state of the decompressor.

UE 145, 250 may receive the configuration information, transmitted by eNB 110, 210, 230, via a dedicated signaling message (e.g., a unicast transmission), and may utilize the configuration information to access a header-compressed broadcast transmission. For example, UE 145, 250 may set a state of a decompressor or reset a state of a decompressor to perform header decompression for a header-compressed broadcast transmission. In this way, UE 145, 250 and/or eNB 110, 210, 230 reduce a utilization of network resources and/or processing resources relative to requiring configuration information to be provided by eNB 110, 210, 230 to UE 145, 250 and one or more other UEs 145, 250 when the single UE 145, 250 is to set a state of a decompressor of the single UE 145, 250 to perform header decompression.

As indicated above, FIG. 4 is provided as an example. Other examples are possible and may differ from what was described above in connection with FIG. 4.

Figure 5:
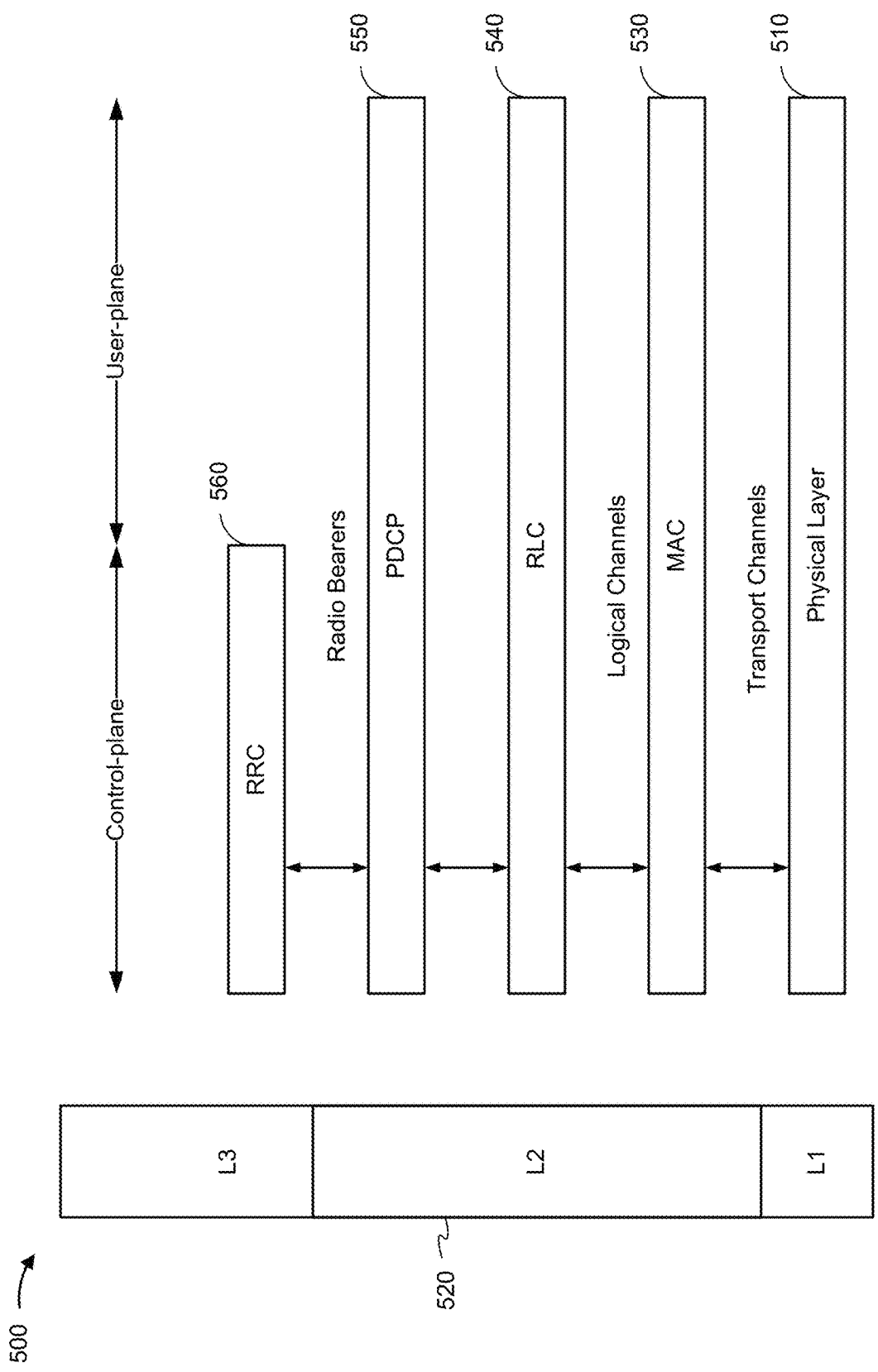
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520, for example, includes a media access control (MAC) sublayer 530, a radio link control (RLC) sublayer 540, and/or a packet data convergence protocol (PDCP) 550 sublayer, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, and/or the like).

The PDCP sublayer 550 provides multiplexing between different radio bearers and logical channels. The PDCP sublayer 550 also provides header compression (e.g., RoHC-based header compression) for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (e.g., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
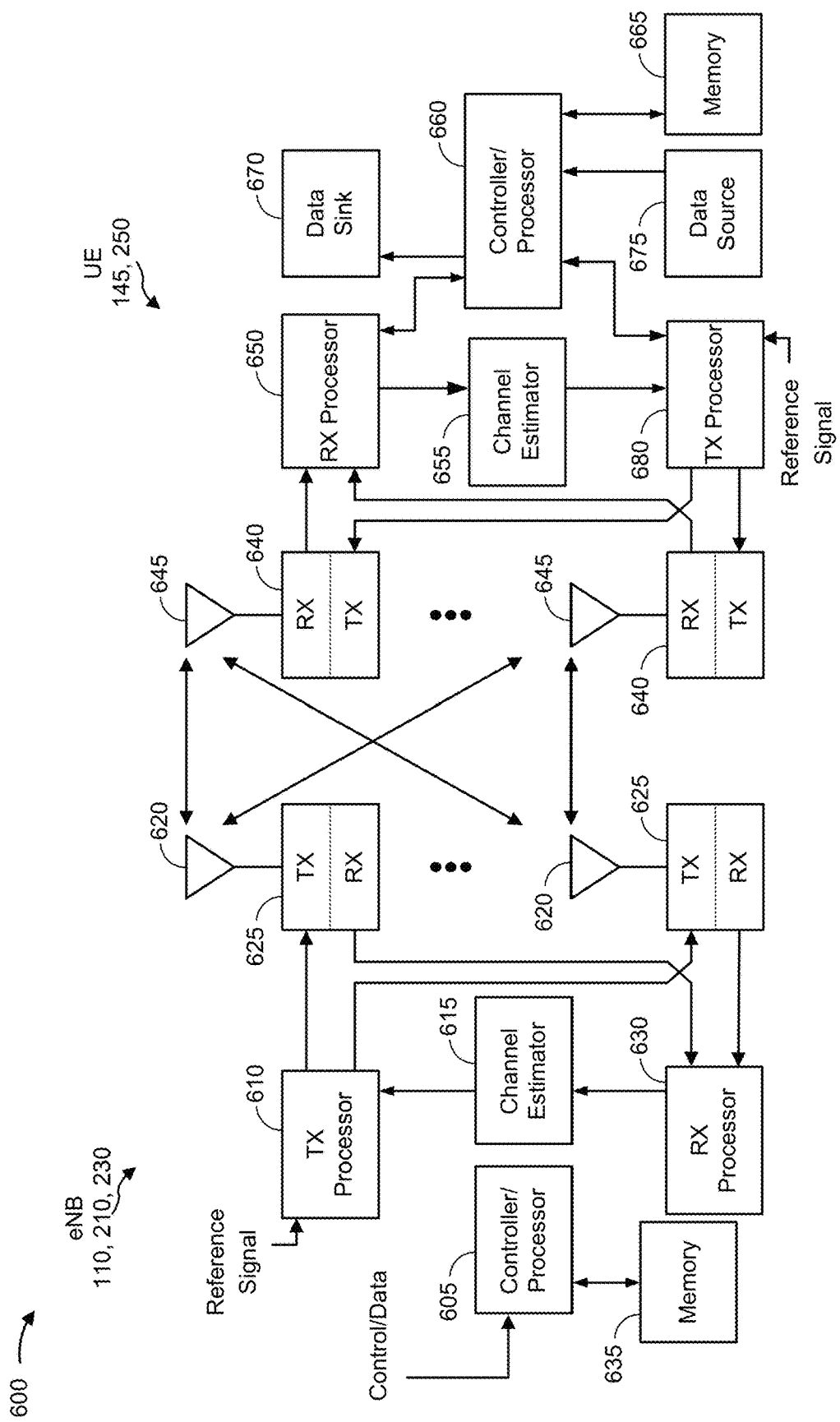
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a transmitter (TX) processor 610, a channel estimator 615, an antenna 620, a transmitter 625TX, a receiver 625RX, a receiver (RX) processor 630, and a memory 635. As further shown in FIG. 6, UE 145, 250 may include a receiver RX 640RX, for example, of a transceiver TX/RX 640, a transmitter TX 640TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX 640TX, for example, of transceiver TX/RX 625. Each such transmitter TX 640TX modulates an RF carrier with a respective spatial stream for transmission.

At the UE 145, 250, each receiver RX 640RX, for example, of a transceiver TX/RX 640 receives a signal through its respective antenna 645. Each such receiver RX 640RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In some aspects, the memory 665 may store a tracking area identifier, associated with a tracking area update, that can be used to determine whether a tracking area is out of synchronization (e.g., whether the tracking area the UE associates with the UE does or may not match the tracking area the network associates with the UE). In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using a positive acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX 640TX, for example, of transceiver TX/RX 640 modulates a radio frequency (RF) carrier with a respective spatial stream for transmission.

The UL transmission is processed at the eNB 110, 210, 230 in a manner similar to that described in connection with the receiver function at the UE 145, 250. Each receiver RX 640RX, for example, of transceiver TX/RX 625 receives a signal through its respective antenna 620. Each receiver RX 640RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the controller/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

One or more components of UE 145, 250 may be configured to access, based on receiving configuration information associated with configuring a state of UE 145, 250 via a unicast transmission, a header-compressed broadcast transmission using the configuration information, as described in more detail elsewhere herein. For example, the controller/processor 660 and/or other processors and modules of UE 145, 250 may perform or direct operations of, for example, process 800 of FIG. 8 and/or other processes, as described herein. In some aspects, one or more of the components shown in FIG. 6 may be employed to perform process 800 of FIG. 8 and/or other processes for the techniques described herein.

One or more components of eNB 110, 210, 230 may be configured to provide configuration information to UE 145, 250 via a unicast transmission to permit UE 145, 250 to access a header-compressed broadcast transmission, as described in more detail elsewhere herein. For example, the controller/processor 605 and/or other processors and modules of eNB 110, 210, 230 may perform or direct operations of, for example, process 900 of FIG. 9 and/or other processes, as described herein. In some aspects, one or more of the components shown in FIG. 6 may be employed to perform process 900 of FIG. 9 and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

As described in more detail below, a mobile device, which may correspond to UE 145, 250, may receive configuration information associated with configuring a state of the mobile device via a unicast transmission provided by a network entity, which may correspond to eNB 110, 210, 230 or another device. The mobile device may set a state of a decompressor based on the configuration information. The mobile device may receive a header-compressed broadcast transmission from the network entity, and may perform decompression on the header-compressed broadcast transmission to access the header-compressed broadcast transmission based on setting the state of the decompressor. In this way, UE 145, 250 and/or eNB 110, 210, 230 may reduce an amount of network traffic relative to requiring multiple unicast transmissions to transmit a communication to multiple UEs 145, 250. Moreover, UE 145, 250 and/or eNB 110, 210, 230 may reduce network traffic and/or a utilization of processing resources relative to requiring an interruption to a header-compressed broadcast transmission whenever configuration information is to be provided to configure a particular UE 145, 250 to perform header decompression.

Figure 7:
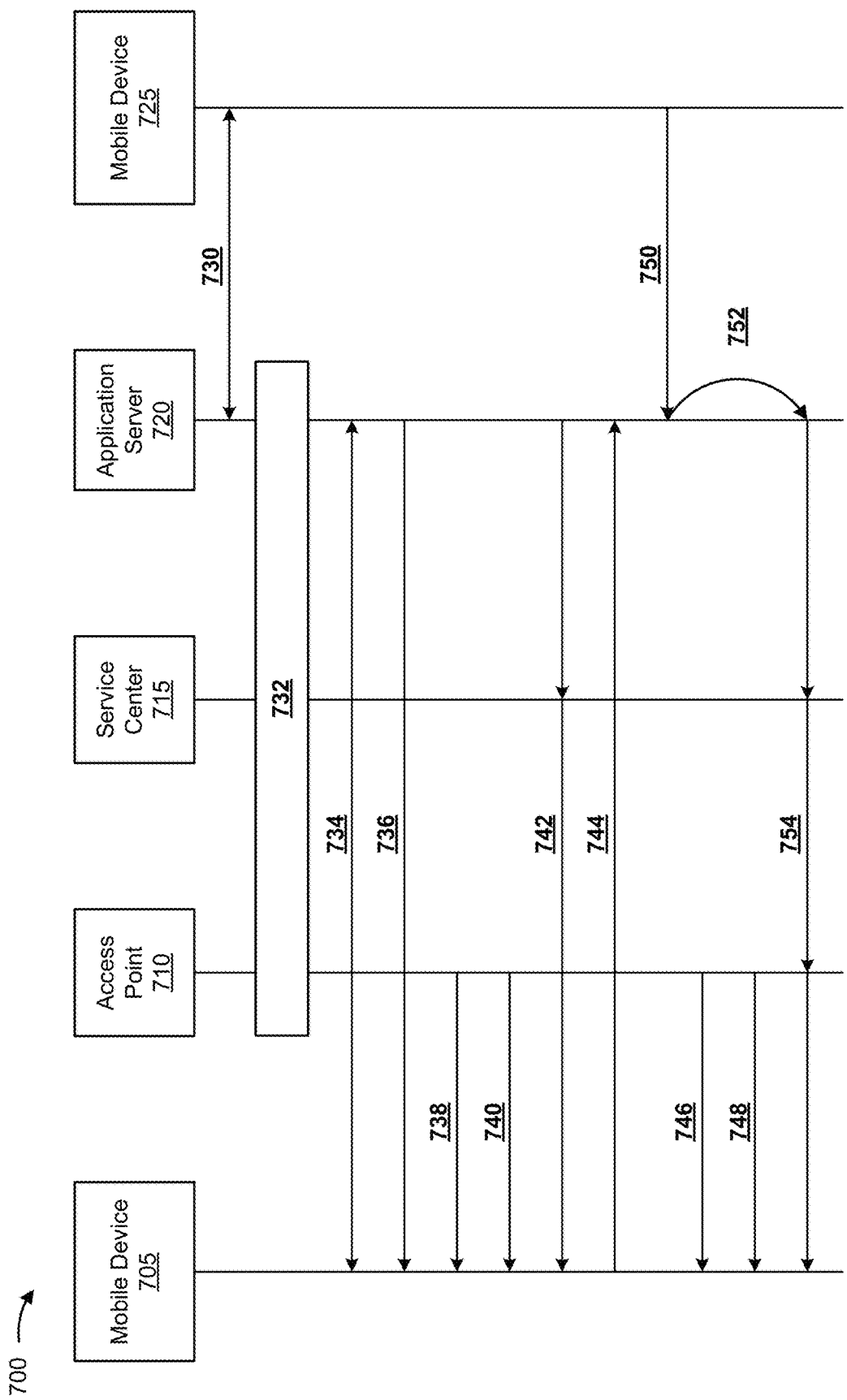
FIG. 7 is a diagram of an overview of an exemplary aspect described herein, in accordance with various aspects of the present disclosure.

FIG. 7 is a diagram illustrating an example 700 of accessing a header-compressed broadcast transmission using configuration information received via a unicast transmission, in accordance with various aspects of the present disclosure.

As shown in FIG. 7, example 700 may include a mobile device 705 (e.g., a UE, such as UE 145, 250), an access point 710 (e.g., an eNB, such as eNB 110, 210, 230), a service center 715 (e.g., a broadcast multicast serving center (BM-SC)), an application server 720 (e.g., a group call service application server (GCS-AS), which may provide a group call service (GCS) functionality), and a mobile device 725 (e.g., a UE, such as UE 145, 250).

As further shown in FIG. 7, and by reference number 730, mobile device 725 and application server 720 may exchange a set of messages 730 to perform call origination processing. For example, mobile device 725 may request that application server 720 establish an eMBMS call to permit mobile device 725 to transmit a set of voice packets toward a group of mobile devices 705 (not shown) via a broadcast transmission.

As further shown in FIG. 7, and by reference number 732, application server 720, service center 715, and access point 710 may exchange a set of messages 732 to perform bearer activation for the broadcast transmission. For example, application server 720 may cause service center 715 and access point 710 to establish one or more broadcast bearers (e.g., eMBMS bearers) to initiate the broadcast transmission.

As further shown in FIG. 7, and by reference number 734, application server 720 and mobile device 705 and/or one or more other mobile devices 705 (not shown) may exchange a set of messages 734 to perform call termination processing. For example, application server 720 may cause a group of mobile devices 705, including mobile device 705, to be configured to receive the eMBMS call via the broadcast transmission.

As further shown in FIG. 7, and by reference number 736, application server 720 may transmit a message 736 to mobile device 705. For example, application server 720 may transmit a bearer announcement message via a unicast transmission (e.g., dedicated signaling for mobile device 705). The bearer announcement message may include information identifying an RoHC configuration for header decompression by a decompressor of mobile device 705. For example, mobile device 705 may receive information indicating that a header-compressed broadcast transmission is utilizing an RoHC profile type 0x0001 (e.g., for real-time transport protocol (RTP)/user datagram protocol (UDP)/Internet Protocol (IP) (collectively UDP/RTP/IP)), an RoHC profile type 0x0002 (e.g., for UDP/IP), or the like. The bearer announcement message may include information identifying a mode for RoHC, such as a unidirectional mode or the like. In another example, application server 720 may transmit message 736 via GC-1 signaling associated with establishing a GCS call. Based on receiving configuration information provided by a network entity via a unicast transmission (e.g., information identifying RoHC configuration), mobile device 705 may synchronize a decompressor of mobile device 705 with a compressor of the network entity to permit decompression of a header-compressed broadcast transmission provided by the network entity.

As further shown in FIG. 7, and by reference numbers 738 and 740, access point 710 may transmit, to mobile device 705, a set of messages 738 and data 740 to mobile device 705. For example, access point 710 may transmit a message 738 via MBMS control channel (e.g., MBMS control channel (MCCH) or single cell MBMS control channel (SC-MCCH)) and data 740 via MBMS traffic channel (e.g., MBMS traffic channel (MTCH) or single cell-MBMS traffic channel (SC-MTCH)) associated with the eMBMS call provided via the broadcast transmission.

As further shown in FIG. 7, and by reference numbers 742 and 744, application server 720 and mobile device 705 may exchange a set of messages 742 and 744. For example, application server 720 may transmit message 742 to map a group to an MBMS bearer established for the broadcast transmission, and mobile device 705 may transmit message 744 to indicate that mobile device 705 is listening on the MBMS bearer to receive the broadcast transmission.

As further shown in FIG. 7, and by reference numbers 746 and 748, mobile device 705 may continue to receive messages 746 and data 748 via the MBMS control channel and the MBMS traffic channel, respectively. In this way, mobile device 705 continues to receive control information associated with configuring eMBMS and/or traffic associated with eMBMS, as described herein.

As further shown in FIG. 7, and by reference number 750, mobile device 725 provides a set of packets for transmission to a group of mobile devices 705 via a broadcast transmission (e.g., via the traffic channel). For example, mobile device 725 may provide a set of voice packets, a set of RTP packets, a set of UDP packets, a set of IP packets, or the like. In some aspects, mobile device 725 may provide the set of packets to application server 720 for compression and transmission, as shown. In some aspects, mobile device 725 may provide the set of packets to another network entity, such as service center 715, access point 710, or the like for header compression and broadcast transmission.

As further shown in FIG. 7, and by reference number 752, application server 720 may perform header compression for the set of packets. For example, application server 720 may perform RoHC compression to generate a header-compressed broadcast transmission. In some aspects, another network entity may perform header compression, such as service center 715, access point 710, or the like.

As further shown in FIG. 7, and by reference number 754, application server 720 may provide the header-compressed broadcast transmission (e.g., via an eMBMS bearer associated with the traffic channel) to mobile device 705. For example, application server 720 may cause one or more access points 710 to provide one or more header-compressed broadcast transmissions to one or more groups of mobile devices 705. Based on receiving the header-compressed broadcast transmission, mobile device 705 may perform header decompression on the header-compressed broadcast transmission to access information conveyed by the header-compressed broadcast transmission. In this case, mobile device 705 may utilize the conveyed information, such as by providing a voice call, utilizing data, or the like.

As indicated above, FIG. 7 is provided as an example. Other examples are possible and may differ from what was described with respect to FIG. 7.

Figure 8:
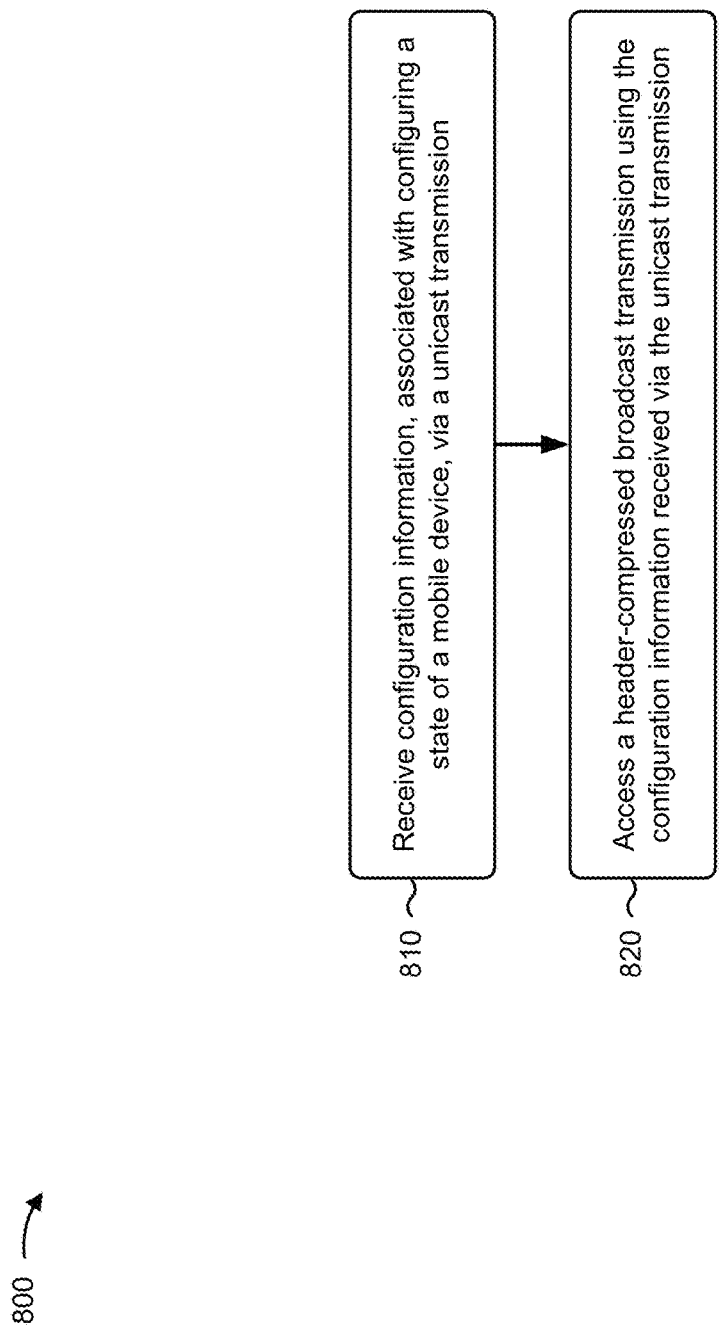
FIG. 8 is a diagram illustrating an example process performed, for example, by a mobile device, in accordance with various aspects of the present disclosure.

FIG. 8 is a diagram illustrating an example process 800 performed, for example, by a mobile device (e.g., a UE 145, 250, 705, 725), in accordance with various aspects of the present disclosure. Example process 800 is an example where a mobile device accesses a header-compressed broadcast transmission using configuration information received via a unicast transmission.

As shown in FIG. 8, in some aspects, process 800 may include receiving configuration information, associated with configuring a state of a mobile device, via a unicast transmission (block 810). For example, the mobile device may receive configuration information, associated with configuring the state of the mobile device, via the unicast transmission. In some aspects, the configuration information may include an RoHC compression profile. For example, the mobile device may receive configuration information relating to selecting an RoHC compression profile that is to be utilized for a header-compressed broadcast transmission. In some aspects, the mobile device may receive configuration information associated with identifying a control channel. For example, the mobile device may receive configuration information including information identifying a header-compressed data stream (e.g., conveying a set of voice frames) associated with a first RoHC compression profile and information identifying a non-compressed data stream associated with a second RoHC compression profile (e.g., conveying RTP control protocol (RTCP) information). Additionally, or alternatively, the mobile device may receive configuration information including information identifying a header-compressed data stream (e.g., conveying a set of voice frames) associated with a first RoHC compression profile and information identifying another header-compressed data stream (e.g., conveying UDP information) associated with a second RoHC compression profile.

In some aspects, the mobile device may receive configuration information including a set of initialization and refresh (IR) packets. For example, the mobile device may receive a set of IR packets with a set of static fields and a set of dynamic fields during an IR time period to aid in decompressing a set of voice frames. In this case, based on a change to a context of a dynamic portion of header-compressed information or based on a threshold period of time elapsing, the mobile device may receive configuration information including a set of IR dynamic type (IR-DYN) packets to aid in decompressing a set of voice frames.

In some aspects, the mobile device may receive configuration information to configure header decompression. For example, the mobile device may receive configuration information relating to synchronizing a state of a decompressor of the mobile device to perform header decompression for a header-compressed transmission received via a broadcast communication channel. In this case, the mobile device may set or reset the state of a decompressor of the mobile device based on the configuration information to permit the mobile device to access a header-compressed broadcast transmission.

In some aspects, the mobile device may receive configuration information relating to a particular type of header-compressed broadcast transmission. For example, the mobile device may receive RoHC decompression configuration information relating to an eMBMS transmission, a group call service (GCS) transmission, a mission-critical push-to-talk (MCPTT) transmission, or the like. In some aspects, the mobile device may receive the configuration information via a particular type of unicast transmission. For example, the mobile device may receive the configuration via dedicated signaling associated with the mobile device, such as via a group call type 1 (GC-1) signaling message, a bearer announcement message, a radio resource control (RRC) signaling message (e.g., a single-cell point-to-multipoint configuration message, such as an SCPTMConfiguration message or the like).

In some aspects, the mobile device may receive the configuration information based on a request. For example, the mobile device may transmit a request for access to a header-compressed broadcast transmission (e.g., to a network entity, such as an access point, a service center, or an application server), and may receive a response, via a unicast transmission, to the request for access to the header-compressed broadcast transmission that includes the configuration information. In some aspects, the mobile device may receive the configuration information based on a request to synchronize decompression after decompression becomes out of synchronization. For example, when a state of a decompressor of the mobile device is out of synchronization with a state of a compressor of a network entity (e.g., determined based on a threshold quantity of checksum failures), the mobile device may request configuration information, and may receive the configuration information via dedicated signaling of the unicast transmission.

As further shown in FIG. 8, in some aspects, process 800 may include accessing a header-compressed broadcast transmission using the configuration information received via the unicast transmission (block 820). For example, the mobile device may access the header-compressed broadcast transmission using the configuration information received via the unicast transmission. The header-compressed broadcast transmission may include an eMBMS transmission, a GCS transmission, a MCTT transmission, or the like compressed using RoHC. In some aspects, the mobile device may receive the header-compressed broadcast transmission from a network entity. For example, the mobile device may receive the header-compressed broadcast transmission based on the network entity performing header compression on a set of packets to generate the header-compressed broadcast transmission.

In some aspects, the mobile device may receive the header-compressed broadcast transmission and may decompress the header-compressed broadcast transmission. For example, the mobile device may decompress a set of packets of the header-compressed broadcast transmission using RoHC decompression to obtain a decompressed set of packets (e.g., a decompressed broadcast transmission). In some aspects, the mobile device may process the decompressed set of packets to obtain a set of voice frames. For example, the mobile device may obtain the set of voice frames and may provide the set of voice frames for playback.

In some aspects, the mobile device may synchronize a state of a decompressor of the mobile device to access the header-compressed broadcast transmission. For example, a decompressor of the mobile device may operate in a set of states (e.g., a no context state, a static context state, or a full context state), and the mobile device may synchronize the set of states to a state of a compressor of a network entity (e.g., an IR state, a first order (FO) state, or a second order (SO) state) based on the configuration information. In this case, based on synchronizing the state of the decompressor based on the configuration information, the mobile device may decompress a set of headers of a set of packets of the header-compressed broadcast transmission.

Additionally, or alternatively, process 800 may include performing RoHC decompression on the header-compressed broadcast transmission to obtain a decompressed broadcast transmission.

Additionally, or alternatively, the configuration information may comprise at least one of an RoHC profile associated with the header-compressed broadcast transmission or one or more initialization and refresh (IR) packets associated with the header-compressed broadcast transmission.

Additionally, or alternatively, process 800 may include synchronizing a decompressor of the mobile device with a compressor of a network entity using the configuration information.

Additionally, or alternatively, the configuration information may include an RoHC profile associated with at least one of an RTCP data stream of the header-compressed broadcast transmission or an RTP data stream of the header-compressed broadcast transmission.

Additionally, or alternatively, process 800 may include receiving the configuration information via the unicast transmission based on a mobile device request to access the header-compressed broadcast transmission.

Additionally, or alternatively, the header-compressed broadcast transmission may include at least one of an eMBMS transmission, a GCS transmission, or an MCPTT transmission.

Additionally, or alternatively, the configuration information may include a set of IR-DYN packets.

Additionally, or alternatively, process 800 may include receiving the configuration information via at least one of a GC-1 signaling message, a bearer announcement message, or an RRC signaling message.

Additionally, or alternatively, process 800 may include setting the state of the mobile device based on the configuration information and accessing the header-compressed broadcast transmission based on setting the state of the mobile device.

Additionally, or alternatively, process 800 may include receiving a set of header-compressed broadcast transmission packets generated by at least one of an eNB, a BM-SC, or a GCS AS.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
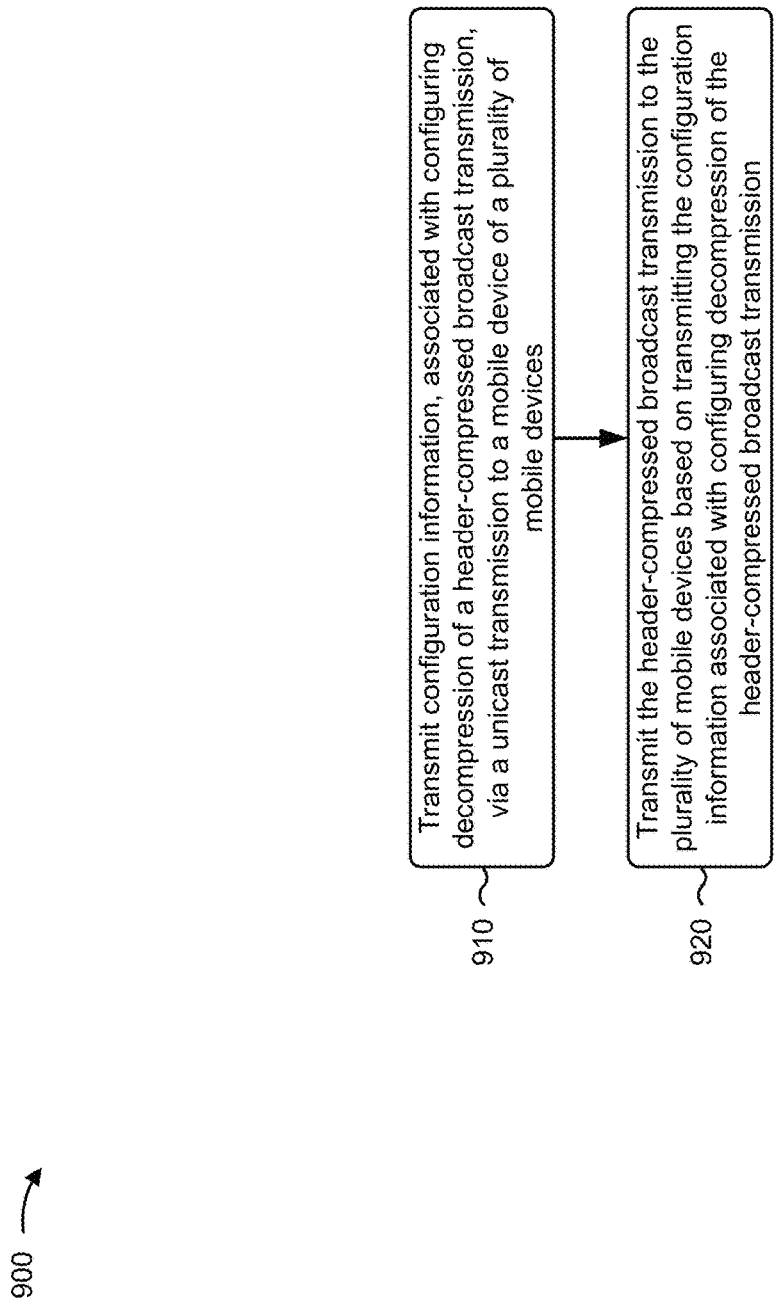
FIG. 9 is a diagram illustrating another example process performed, for example, by a network entity, in accordance with various aspects of the present disclosure.

FIG. 9 is a diagram illustrating an example process 900 performed, for example, by a network entity (e.g., an eNB 110, 210, 230, 710, a service center 715, or an application server 720), in accordance with various aspects of the present disclosure. Example process 900 is an example where a network entity transmits information associated with configuring decompression of a header-compressed broadcast transmission via a unicast transmission.

As shown in FIG. 9, in some aspects, process 900 may include transmitting configuration information, associated with configuring decompression of a header-compressed broadcast transmission, via a unicast transmission to a mobile device of a plurality of mobile devices (block 910). For example, a network entity may transmit configuration information associated with configuring decompression of header-compressed information via the unicast transmission to the mobile device of the plurality of mobile devices. In some aspects, the network entity may transmit configuration information via the unicast transmission to configure decompression of a header-compressed broadcast transmission. For example, the network entity may utilize dedicated signaling to transmit configuration information to the mobile device to permit the mobile device to perform header decompression of a header-compressed broadcast transmission provided to the plurality of mobile devices. In this way, the network entity avoids generating excessive network traffic by providing the configuration information to each mobile device of the plurality of mobile devices that are to receive the header-compressed broadcast transmission when a single mobile device requires the configuration information (i.e., the other ones of the plurality of mobile devices already have the configuration information). Similarly, the network entity permits a mobile device to join a header-compressed broadcast transmission during transmission rather than requiring each mobile device to be configured to access the header-compressed broadcast transmission prior to a start of transmission.

In some aspects, the network entity may transmit the configuration information associated with configuring decompression based on receiving a request. For example, when mobile device is to access a header-compressed broadcast transmission, such as an eMBMS transmission, a GCS transmission, an MCPTT transmission, or the like, the mobile device may request access to the header-compressed broadcast transmission. In this case, the network entity may transmit configuration information via a unicast transmission to configure the mobile device to access the header-compressed broadcast transmission.

In some aspects, the network entity may transmit the configuration information associated with configuring decompression periodically. For example, during transmission of the header-compressed broadcast transmission, the network entity may determine that a time threshold is satisfied, such as an IR time threshold, an FO time threshold, or the like, and may determine to provide configuration information to synchronize decompression of the header-compressed broadcast transmission. In some aspects, the network entity may transmit the configuration information associated with configuring decompression based on detecting a change to a context of the header-compressed broadcast transmission. In some aspects, the network entity may transmit the configuration information associated with configuring decompression based on detecting that a compressor and a decompressor are not synchronized. For example, based on received information, an alteration to a header of the header-compressed broadcast transmission, or the like, the network entity may detect that a compressor of the network entity and a decompressor of a mobile device are not synchronized, and may transmit the configuration information to resynchronize the compressor and the decompressor.

In some aspects, the network entity may transmit the configuration information associated with configuring decompression via a particular type of unicast transmission, such as via GC-1 signaling, RRC signaling, a bearer announcement message, or the like. In some aspects, the network entity may include a particular type of packet in in the configuration information. For example, the network entity may include a set of IR packets (e.g., with a set of static fields and a set of dynamic fields), a set of IR-DYN packets, or the like to configure a state of a decompressor of the mobile device.

As shown in FIG. 9, in some aspects, process 900 may include transmitting the header-compressed broadcast transmission to the plurality of mobile devices based on transmitting the configuration information associated with configuring decompression of the header-compressed broadcast transmission (block 920). For example, the network entity may transmit the header-compressed broadcast transmission to the plurality of mobile devices. In some aspects, the network entity may transmit the header-compressed broadcast transmission based on transmitting, to the mobile device, the configuration information via the unicast transmission. For example, based on transmitting the configuration information via the unicast transmission to permit the mobile device to access a header-compressed broadcast transmission, the network entity may transmit the header-compressed broadcast transmission to the plurality of mobile devices, which includes the mobile device.

In some aspects, the network entity may compress information (e.g., a communication) to generate the header-compressed broadcast transmission. For example, a compressor of the network entity may compress a set of packets (e.g., a set of voice frames) using RoHC, and may provide the set of packets via the header-compressed broadcast transmission (e.g., an eMBMS transmission). In this case, the mobile device may decompress the set of packets received via the header-compressed broadcast transmission to access information conveyed by the set of packets (e.g., the set of voice frames).

Additionally, or alternatively, process 900 may include compressing a communication using RoHC to generate the header-compressed broadcast transmission and transmitting the header-compressed broadcast transmission to convey the communication based on compressing the communication using RoHC.

Additionally, or alternatively, process 900 may include receiving a request for access to the header-compressed broadcast transmission and transmitting the configuration information based on receiving the request for access to the header-compressed broadcast transmission.

Additionally, or alternatively, the unicast transmission may include at least one of a GC-1 signaling message, an RRC signaling message, or a bearer announcement message.

Additionally, or alternatively, the network entity may include at least one of an eNB, a BM-SC, or GCS AS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Techniques and apparatuses described herein may cause a network entity to provide and a mobile device to receive configuration information associated with configuring a state of the mobile device via a unicast transmission, and may cause the mobile device to access a header-compressed broadcast transmission based on the configuration information. This may improve a performance of the mobile device by permitting the mobile device to access a header-compressed broadcast transmission. This may improve network performance relating to the network entity by obviating a need to interrupt the header-compressed broadcast transmission to provide configuration information via a broadcast channel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. For example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean, "based, at least in part, on" unless explicitly stated otherwise.

What is claimed is:

1. A method of wireless communications performed by a mobile device, comprising:
   receiving configuration information, associated with configuring a state of the mobile device, via a unicast transmission,
      wherein the configuration information, received via the unicast transmission, includes at least one of:
         an initialization and refresh (IR) packet including a static field and a dynamic field, or
         a initialization and refresh dynamic type (IR-DYN) packet; and
   accessing a header-compressed broadcast transmission using the configuration information received via the unicast transmission.

2. The method of claim 1, wherein accessing the header-compressed broadcast transmission comprises:
   performing robust header compression (RoHC) decompression on the header-compressed broadcast transmission to obtain a decompressed broadcast transmission.

3. The method of claim 1, wherein the configuration information comprises:
   a robust header compression (RoHC) profile associated with the header-compressed broadcast transmission.

4. The method of claim 1, wherein accessing the header-compressed broadcast transmission comprises:
   synchronizing a decompressor of the mobile device with a compressor of a network entity using the configuration information.

5. The method of claim 1, wherein the configuration information comprises a robust header compression (RoHC) profile associated with at least one of:
   a real-time transport protocol (RTP) control protocol (RTCP) data stream of the header-compressed broadcast transmission, or
   an RTP data stream of the header-compressed broadcast transmission.

6. The method of claim 1, wherein receiving the configuration information via the unicast transmission comprises:
   receiving the configuration information via the unicast transmission based on a mobile device request to access the header-compressed broadcast transmission.

7. The method of claim 1, wherein the header-compressed broadcast transmission is at least one of:
   an evolved multimedia broadcast multicast services (eMBMS) transmission,
   a group call service (GCS) transmission, or
   a mission-critical push-to-talk (MCPTT) transmission.

8. The method of claim 1, wherein the configuration information includes a set of IR-DYN packets.

9. The method of claim 1, wherein receiving the configuration information via the unicast transmission comprises:
   receiving the configuration information via at least one of:
      a group call type 1 (GC-1) signaling message,
      a bearer announcement message, or
      a radio resource control (RRC) signaling message.

10. The method of claim 1, further comprising:
    setting the state of the mobile device based on the configuration information; and
    wherein accessing the header-compressed broadcast transmission comprises:
       accessing the header-compressed broadcast transmission based on setting the state of the mobile device.

11. The method of claim 1, wherein receiving the header-compressed broadcast transmission comprises:
    receiving a set of header-compressed broadcast transmission packets generated by at least one of:
       an evolved Node B (eNB),
       a broadcast multicast service center (BM-SC), or
       a group call service (GCS) application server (AS).

12. A mobile device, comprising:
    one or more processors configured to:
       receive configuration information, associated with configuring a state of the mobile device, via a unicast transmission,
          wherein the configuration information, received via the unicast transmission, includes at least one of:
             an initialization and refresh (IR) packet including a static field and a dynamic field, or
             a initialization and refresh dynamic type (IR-DYN) packet; and
       access a header-compressed broadcast transmission using the configuration information received via the unicast transmission; and
    a memory coupled to the one or more processors.

13. The mobile device of claim 12, wherein the one or more processors, when accessing the header-compressed broadcast transmission, are configured to:
    perform robust header compression (RoHC) decompression on the header-compressed broadcast transmission to obtain a decompressed broadcast transmission.

14. The mobile device of claim 12, wherein the configuration information comprises:
    a robust header compression (RoHC) profile associated with the header-compressed broadcast transmission.

15. The mobile device of claim 12, wherein the one or more processors, when accessing the header-compressed broadcast transmission, are configured to:
    synchronize a decompressor of the mobile device with a compressor of a network entity using the configuration information.

16. The mobile device of claim 12, wherein the configuration information comprises a robust header compression (RoHC) profile associated with at least one of:
    a real-time transport protocol (RTP) control protocol (RTCP) data stream of the header-compressed broadcast transmission, or
    an RTP data stream of the header-compressed broadcast transmission.

17. The mobile device of claim 12, wherein the one or more processors, when receiving the configuration information via the unicast transmission, are configured to:
    receive the configuration information via the unicast transmission based on a mobile device request to access the header-compressed broadcast transmission.

18. The mobile device of claim 12, wherein the header-compressed broadcast transmission is at least one of:
    an evolved multimedia broadcast multicast services (eMBMS) transmission, a group call service (GCS) transmission, or
a mission-critical push-to-talk (MCPTT) transmission.

19. The mobile device of claim 12, wherein the configuration information includes a set of IR-DYN packets.

20. The mobile device of claim 12, wherein the one or more processors, when receiving the configuration information via the unicast transmission, are configured to:
    receive the configuration information via at least one of:
        a group call type 1 (GC-1) signaling message,
        a bearer announcement message, or
        a radio resource control (RRC) signaling message.

21. The mobile device of claim 12, wherein the one or more processors are further configured to:
    set the state of the mobile device based on the configuration information; and
    wherein the one or more processors, when accessing the header-compressed broadcast transmission, are configured to:
        access the header-compressed broadcast transmission based on setting the state of the mobile device.

22. The mobile device of claim 12, wherein the one or more processors, when receiving the header-compressed broadcast transmission, are configured to:
    receive a set of header-compressed broadcast transmission packets generated by at least one of:
        an evolved Node B (eNB),
        a broadcast multicast service center (BM-SC), or
        a group call service (GCS) application server (AS).

23. A method of wireless communications performed by a network entity, comprising:
    transmitting configuration information, associated with configuring decompression of a header-compressed broadcast transmission, via a unicast transmission to a mobile device of a plurality of mobile devices,
        wherein the configuration information, transmitted via the unicast transmission, includes at least one of:
            an initialization and refresh (IR) packet including a static field and a dynamic field, or
            a initialization and refresh dynamic type (IR-DYN) packet; and
    transmitting the header-compressed broadcast transmission to the plurality of mobile devices in accordance with the configuration information associated with configuring decompression of the header-compressed broadcast transmission.

24. The method of claim 23, further comprising:
    compressing a communication using robust header compression (RoHC) to generate the header-compressed broadcast transmission; and
    wherein transmitting the header-compressed broadcast transmission comprises:
        transmitting the header-compressed broadcast transmission to convey the communication to the plurality of mobile devices based on compressing the communication using RoHC.

25. The method of claim 23, further comprising:
    receiving a request for access to the header-compressed broadcast transmission; and
    wherein transmitting the configuration information via the unicast transmission comprises:
        transmitting the configuration information in response to receiving the request for access to the header-compressed broadcast transmission.

26. The method of claim 23, wherein the unicast transmission comprises at least one of:
    a group call type 1 (GC-1) signal,
    a radio resource control (RRC) signal, or
    a bearer announcement message.

27. The method of claim 23, wherein the network entity comprises at least one of:
    an evolved node B (eNB),
    a broadcast multicast service center (BM-SC), or
    a group call service (GCS) application server (AS).

28. A network entity, comprising:
    one or more processors configured to:
        transmit configuration information, associated with configuring decompression of a header-compressed broadcast transmission, via a unicast transmission to a mobile device of a plurality of mobile devices,
            wherein the configuration information, transmitted via the unicast transmission, includes at least one of:
                an initialization and refresh (IR) packet including a static field and a dynamic field, or
                a initialization and refresh dynamic type (IR-DYN) packet; and
        transmit the header-compressed broadcast transmission to the plurality of mobile devices based on transmitting the configuration information associated with configuring decompression of the header-compressed broadcast transmission; and
    a memory coupled to the one or more processors.

29. The network entity of claim 28, wherein the one or more processors are further configured to:
    compress a communication using robust header compression (RoHC) to generate the header-compressed broadcast transmission; and
    wherein the one or more processors, when transmitting the header-compressed broadcast transmission, are configured to:
        transmit the header-compressed broadcast transmission to convey the communication to the plurality of mobile devices based on compressing the communication using RoHC.

30. The network entity of claim 28, wherein the one or more processors are further configured to:
    receive a request for access to the header-compressed broadcast transmission; and
    wherein the one or more processors, when transmitting the configuration information via the unicast transmission, are configured to:
        transmit the configuration information in response to receiving the request for access to the header-compressed broadcast transmission.

* * * * *